United States Patent Office 2,759,715
Patented Aug. 21, 1956

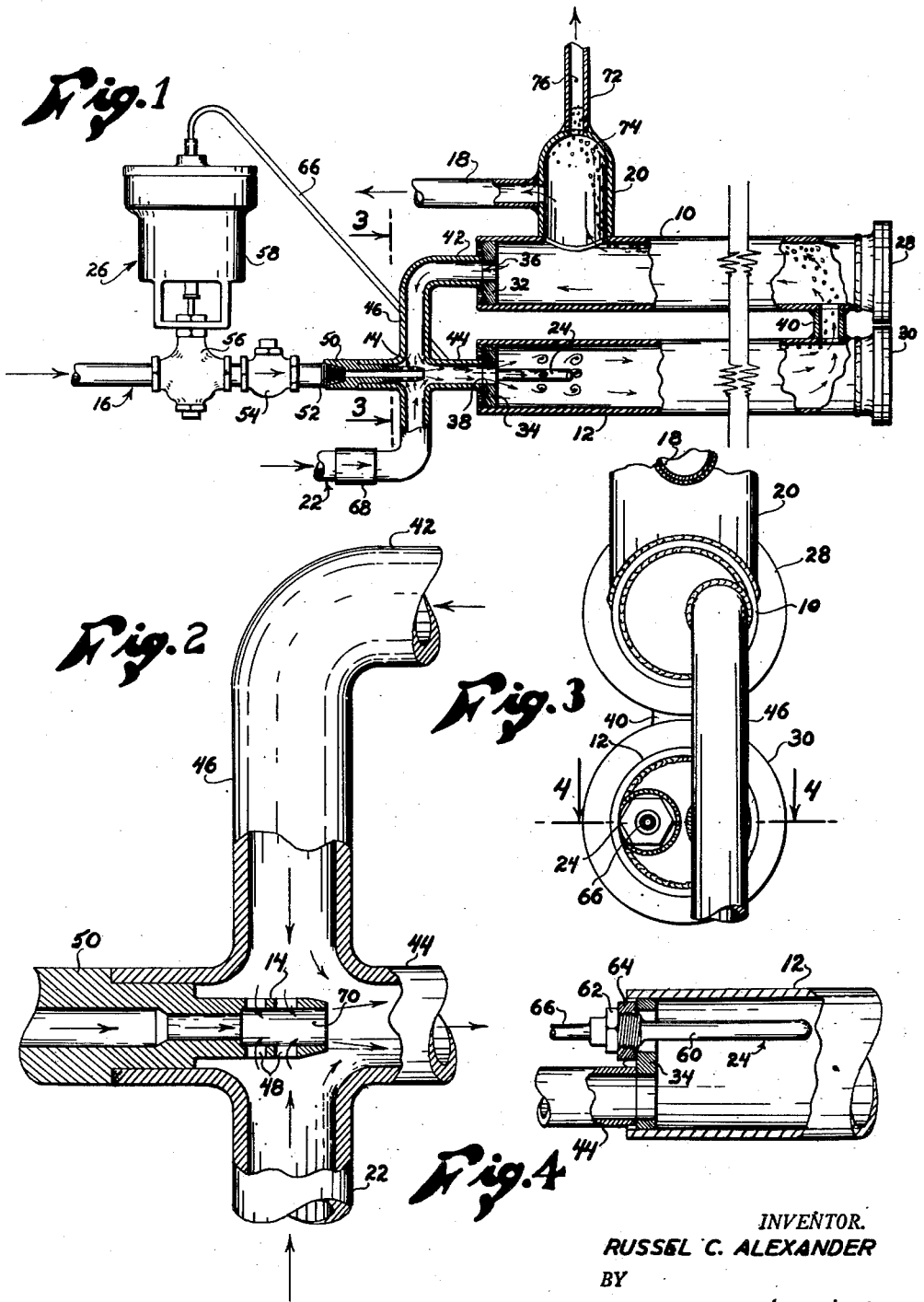

2,759,715

LIQUID HEATING DEVICE

Russel C. Alexander, Long Beach, Calif., assignor to Railway Steam Research Corporation, Monterey Park, Calif., a corporation of California Application September 1, 1951, Serial No. 244,763

11 Claims. (Cl. 261—39)

The present invention relates generally to liquid heating devices, and particularly to a device for heating water by direct contact with steam.

A number of devices have previously been proposed adapted to heat water by direct contact with steam. These devices are generally of the "open" type, in contrast to the "closed" type heater wherein the temperature of the water is raised by an interchange of heat through tubular means in which the steam or water flows. The closed type heaters probably find their widest application as feed-water heaters for boiler use. However, they are also utilized extensively for heating water for commercial processes, as well as for heating water for the personal use of occupants of large buildings or ships. The conventional open type heater comprises a hollow vessel wherein water is admitted at the top to flow into a distributing trough and then passes downwardly through a series of perforated trays. The trays break up the flow of cold water into a number of small cascading streams which are heated by steam admitted through the side of the vessel.

Although this type of open heater performs fairly satisfactorily under ordinary conditions, it has the disadvantage that its output is relatively constant and does not automatically increase and decrease in accordance to the demand for hot water.

Another disadvantage of the conventional open type water heater is the relatively large size of the unit, which prevents its use in those installations such as locomotives, ships and other vehicles where space is of paramount importance.

A further disadvantage connected with the use of conventional liquid heating devices is that they are disagreeably noisy in operation. This disadvantage may be particularly annoying when the heater is utilized within earshot of a number of people, as for example in a building. Hence, one of the objects of the present invention is to provide a liquid heating device which is reasonably quiet in operation.

It is a major object of the present invention to provide a compact, light-weight fluid heating unit capable of heating the fluid in a relatively short time which automatically adjusts the quantity of fluid heated to that required to satisfy the demand.

It is a further object of this invention to provide a liquid heating device which is more economical in operation than conventional devices of this type. This economy of operation results primarily from the fact that the rate at which steam is admitted is proportional to the rate at which heated liquid is being withdrawn. In the conventional liquid heating device it is necesasry to maintain the liquid at a temperature higher than that at which it is to be used in order to meet sudden demands. Such sudden demands being met by adding cold liquid to the overly heated liquid whereby to obtain liquid existing at the desired temperature. With a liquid heating device constructed in accordance with the present invention however, the entire body of liquid is maintained at the desired temperature and upon sudden demand the rate of heating is automatically increased.

It is a further object of this invention to provide a liquid heating device utilizing steam as a heating agent wherein such steam is admitted only at such time as the temperature falls below a predetermined value. This feature also contributes to the economy of operation.

It is another object of the invention to provide a liquid heating device wherein the entire body of liquid being heated is maintained at substantially the same temperature.

A still further object is to provide a liquid heating device incorporating a special steam nozzle so arranged as to effect circulation of the entire body of liquid being heated within the device. This nozzle is also arranged so as to effect thorough intermixing of the circulated liquid and the steam passing therethrough. A liquid heating device constructed in accordance with the present invention may also include a fresh water inlet disposed adjacent the special steam nozzle whereby steam passing therethrough may be utilized both as a barrier means preventing direct movement of the circulated liquid into the fresh water inlet and also as means for effecting thorough intermixing of the circulated and fresh water with the steam.

Another object of this invention is to provide a liquid heating device having means for removing entrained gas bubbles from the liquid being heated whereby heated liquid free of such bubbles may be supplied. Such a condition is of the utmost importance when the unit is used for the preheating of boiler feed water.

It is a further object of the present invention to provide a liquid heating device which through incorporating the aforementioned advantages and features, is comparatively inexpensive of manufacture and is trouble-free in use.

Other objects and advantages of the present invention will become apparent from the following detailed description, reference being had to the accompanying drawings, wherein:

Figure 1 is a side view, partly in section, showing a liquid heating device constructed in accordance with the present invention;

Figure 2 is a fragmetnary enlarged view of a detail of Figure 1 showing a special nozzle which may be utilized with the liquid heating device shown therein;

Figure 3 is a fragmentary enlarged view taken on line 3—3 of Figure 1; and

Figure 4 is a fragmentary enlarged view, partly in section, taken on line 4—4 of Figure 3.

Referring now to the drawings, and particularly to Figure 1 thereof, the preferred form of heating device wherein the present invention is embodied, comprises broadly a pair of elongated vessels, generally designated 10 and 12, respectively, adapted to contain liquid (usually water) to be heated. The heat is furnished by means of steam injected into the lower vessel 12 through a nozzle 14, which nozzle is supplied through a steam line 16. Heated water may be withdrawn from the device through an outlet pipe 18 mounted on the side of a gas and air bubble-trapping dome 20 formed upon the top of the upper vessel 10. Fresh water to be heated may enter the lower vessel 12 through an inlet pipe 22. The rate of steam input may be automatically controlled by means of a thermo-responsive means 24 disposed within one of the vessels 12, which means is connected to a valve 26 included in the steam line 16.

More particularly, the vessels 10 and 12 are preferably of a cylindrical configuration and closed at one of their ends by heads 28 and 30, respectively. Their opposite ends may include closure members 32 and 34, respectively, formed with central bores 36 and 38. The vessels may be interconnected adjacent their head ends by a vertical conduit 40, and at their opposite ends by longitudinally directed discharge and flow pipes 42 and 44 mounted by vessels 10 and 12, respectively, and a vertically disposed recirculating pipe 46; the latter connecting the discharge and flow pipes. It should be particularly noted that by virtue of the interconnection of the vessels 10 and 12, upon admission of steam through the nozzle 14 the water within these vessels will be caused to circulate in a counterclockwise direction as indicated by the small arrows in Figure 1.

The nozzle 14 is shown mounted at the intersection of the flow pipe 44, the recirculating pipe 46 and the upstanding portion of the inlet pipe 22. Preferably, as shown in Figure 2, this nozzle is formed with a plurality of apertures 48. The base 50 of the nozzle is shown as being threaded to the end of the steam line 16, as indicated at 52. The steam line 16 preferably includes a conventional check valve 54 and a conventional regulating valve 56. An actuating means 58 for the regulating valve is shown mounted thereabove, which actuating means is connected to the thermo-responsive means 24 disposed within vessel 12.

The preferred form of thermo-responsive means 24 comprises a device known generally as a "thermal bulb" to those familiar with the art, which bulb is merely a thin-walled metal container 60 wherein is disposed a fluid, such as mercury, which fluid undergoes a change of volume when exposed to a change of temperature. As shown in Figures 3 and 4, the base 62 of the container 60 may be threadedly secured within a mounting element 64 rigidly affixed to the closure member 34 of vessel 12 whereby the container will protrude into the interior of this vessel. The container 60 is shown connected to the actuating means 58 by a tubular metal line 66 also filled with mercury. It is contemplated that upon a change of temperature of the water within vessel 12, the mercury will either expand or contract within the container 60 and the line 66 so as to expand or contract a diaphragm (not shown) mounted within the actuating means 58. Expansion or contraction of this diaphragm causes the regulating valve 56 to admit a greater or lesser amount of steam through nozzle 14. This type of arrangement for regulating the flow of steam into a heating device is well known to the art and is not believed to require a detailed description. It forms no part of the novelty of the present invention except as used in combination with the other elements thereof.

The inlet pipe 22 is in communication with a source of fresh water (not shown). A conventional check valve 68 is preferably included in this pipe 22. It should be particularly observed that positioning of the nozzle 14 at the intersection of the flow, recirculating and inlet pipes permits the steam injected through the nozzle to effect three very important operations simultaneously. Thus, the jet of steam entering the flow pipe through the nozzle 14 will firstly effect circulation of water between the two vessels 10 and 12. By this arrangement, substantially the entire body of water is exposed to direct contact with the steam, which factor alone is largely responsible for the fact that the present heating device can supply an appreciable quantity of heated water in a very short period of time. The entry of steam through the nozzle will secondly effect thorough intermixing of both the fresh water entering through inlet pipe 22 and the recirculated water passing downwardly through the recirculating pipe 46 with incoming steam jet; a portion of both the fresh and recirculated water entering the bore 70 of the nozzle by means of the apertures 48, as shown clearly in Figure 2. The entry of steam through the nozzle will thirdly form a barrier restraining direct movement of fresh water into the lower end of the recirculating pipe 46 and of recirculated water into the upper end of the inlet pipe 22. In this manner the flow of the two bodies of water within their pipes will not be restricted.

The gas bubble-trapping dome 20 formed upon the top of the vessel 10 preferably includes a gas venting pipe 72, which pipe may be provided with a valve (not shown) at its upper end adapted to open in the presence of gas. Alternately, the pipe 72 may be of a sufficient height as to contain a column of water having a head corresponding to the water pressure within the vessel 10. Gas bubbles 74 (such as air) entrained in the water being heated are shown rising within the dome 20 for discharge to the atmosphere through the venting pipe 72. The outlet pipe is shown mounted at one side of the dome in such a position that bubble-free heated water may be withdrawn therefrom.

In operation, the steam being shut off, the vessels are first filled with water and the temperature regulating valve actuating means 58 set to deliver steam whenever the temperature of the water within vessel 12 falls below a certain value. At the time the vessels are filled with water an air space 76 should be left in the upper portion of the gas venting pipe 72, or alternately at the time the steam is permitted to flow through the nozzle 14, a small amount of water should be released through the outlet pipe 18 so as to provide this air space 76.

The provision of this air space allows the gas bubbles to escape from the water being heated and if it is not provided, water containing entrapped gas bubbles will be free to flow through outlet pipe 18. It should be realized, however, that in many liquid heating installations it is not necessary to supply gas-free water. If such is the case, the device need not necessarily include either a dome or a gas vent.

Once the steam in line 16 is turned on, steam will continue to flow through the nozzle 14 until the temperature of the water adjacent the thermo-responsive container 60 rises above the desired value. At this time the actuating means 58 will close the regulating valve 56. In this respect it should be noted that because of the constant circulation of the water in the two vessels the entire body of water contained therein is maintained at substantially the same temperature. Moreover, it should also be noted that the rate at which water is circulated between the two vessels and past the jet of steam flowing from the nozzle 14 is determined by the temperature of the water being heated. Hence, heating of cold water may take place in a very short period of time.

An important feature of the preferred form of heating device is that the rate at which heating occurs is directly proportional to the rate at which heated water is being withdrawn therefrom. Thus, once the device is set in operation and water is withdrawn from outlet pipe 18, fresh water may be admitted either automatically or manually through inlet pipe 22. This fresh water will be forced into the vessel 12 under the influence of steam passing through nozzle 14 so as to lower the temperature of the water therein. When the water temperature is lowered the thermo-responsive means will cause the regulating valve 56 to admit more steam whereby the rate of heating will be increased. It will be evident that the higher the rate at which heated water is withdrawn, the higher the rate at which fresh water will enter vessel 12, whereby the higher the rate at which steam will enter through nozzle 14, and hence the greater the rate at which heating takes place.

In view of its rapid heating qualities, the aforedescribed heating device may be made of small and compact proportions whereby it finds particular use in movable vehicles such as trains or ships. Moreover, a device of this type is very quiet in operation whereby it is well adapted for use in installations where disagreeable noise cannot be tolerated, as for example, it may be used to supply hot water to an apartment or office building. A liquid heating device of this type is simple of construction and is capable of providing long and trouble-free use.

The aforedescribed heating device is very quiet in operation for the reason that whenever steam is admitted through the nozzle 14 the water within the two vessels will undergo fairly rapid circulatory movement. Hence, the steam entering through the nozzle has no opportunity to form large steam bubbles as occurs with conventional water heaters wherein steam is injected directly into a static body of water. It is the collapse of these steam bubbles when the steam condenses which effects the disagreeable "water hammer" associated with such conventional heaters.

Various modifications and changes may be made with respect to the foregoing description without departing from the spirit of the invention or the scope of the following claims.

I claim:

1. A feed water heater which includes: a U-shaped tubular water heating means embodying first and second open-ended tubular members that are parallel and laterally separated from one another; a tubular cross having four arms, the first and second of which are in coaxial alignment, and the third and fourth arms being coaxially aligned; means connecting said first arm to a source of feed water; tubular means connecting said second arm to said open end of said second member; a steam nozzle disposed within the confines of said third arm; control means connected to said nozzle to regulate the quantity of steam discharged therefrom; tubular means connecting said fourth arm to said open end of said first member substantially in coaxial alignment therewith; thermostatic means for regulating said control means, said thermostatic means being disposed in said first member in a position to be contacted by water adjacent said nozzle, said thermostatic means serving to actuate said control means to discharge an increasing quantity of steam as the temperature to which said thermostatic means is subjected decreases, and said thermostatic means causing said control means to completely close when subjected to a predetermined maximum temperature; and means to withdraw heated water from said second member as needed, said withdrawal permitting feed water at a lower temperature than that of water in said heating means to enter said first member from said first arm, to actuate said control means and cause steam to be discharged from said nozzle as a jet, said jet serving as a barrier for fluid communication between said first and second arms and said jet concurrently heating, intimately mixing, and forcibly circulating both initially introduced feed water and water circulating through said closed path until said mixed waters reach said predetermined temperature.

2. A feed water heater capable of supplying heated water as required at a constant predetermined temperature irrespective of the rate of withdrawal therefrom, which includes: water heating means in the form of two vertically spaced tubular members connected at their ends by two vertically disposed tubular legs; a steam nozzle extending into said water heating means at substantially the intersection of one of said legs and the lowermost of said tubular members; means to introduce feed water into said heating means below and adjacent to said nozzle; means for supplying steam to said nozzle which is discharged therefrom as a jet to move water in said lowermost member away from said nozzle, with movement of said water causing the balance of the water in said heating means to circulate in the closed path defined thereby, and said jet concurrently heating and mixing said circulating water with water introduced into said heating means through said feed water means; a temperature responsive valve that controls said steam supply means; a thermostat that progressively opens said valve as the temperature of said circulating water drops below said predetermined temperature, and closes said valve when said circulating water exceeds said predetermined temperature; means to permit air and gas to escape from said circulating water as it is heated in said heating means; and means to withdraw water heated to said predetermined temperature as needed from said heating means, which withdrawal permits additional water to be introduced into said heating means from said feed water introducing means, with said introduced water being mixed and heated with said circulating water in said heating means to said predetermined temperature due to the action of said steam jet.

3. A feed water heater capable of supplying heated water as required at a constant predetermined temperature irrespective of the rate of withdrawal therefrom, which includes: water heating means that define a closed path in which water can circulate and formed from two vertically spaced tubular members joined at their ends by two substantially vertical tubular legs; a steam nozzle extending into said water heating means at substantially the intersection of one of said legs with the lowermost of said tubular members; means for introducing feed water into said water heating means below said nozzle and in substantial vertical alignment with said tubular leg closest said nozzle; means to supply steam to said nozzle which is discharged therefrom as a jet to move water in said lowermost member away from said nozzle, with movement of said water causing the balance of the water in said heating means to circulate in said closed path, said jet concurrently heating and mixing said circulating water with water introduced into said heating means through said feed water means, and said jet serving as a barrier to prevent feed water entering said heating means flowing upwardly in said tubular leg closest said nozzle; a temperature responsive valve that controls the rate of steam flow through said steam supply means, which valve closes at a predetermined elevated temperature, and gradually opens as the temperature drops below said elevated temperature until said valve is fully open when a predetermined minimum temperature is reached; temperature indicating means located within the confines of said water heating means adjacent said nozzle and operatively associated with said valve; means to permit air and gas to escape from said circulating water as it is heated in said heating means; and means for withdrawing water heated to said predetermined temperature from said heating means as said water circulates.

4. A device for use with a feed water heater in which water circulates through a closed path during the heating thereof, comprising: a tubular cross having four arms, with the first and second arms in coaxial alignment, and the third and fourth arms in coaxial alignment; means connecting said first arm to a source of feed water; means connecting said second and fourth arms to a feed water heater to complete a closed path in which feed water admitted through said first arm circulates during the heating thereof; a tubular steam nozzle disposed in alignment with said third arm and having one end portion situated between said first and second arms, which end portion has a plurality of apertures formed in the wall thereof; and means connecting said nozzle to a source of steam that is discharged from said nozzle as a jet with sufficient force to circulate feed water entering said heater through said closed path, said jet serving as a barrier to prevent circulating water in said heater from entering said first arm and initially introduced feed water entering said second arm, and said initially introduced feed water and circulating feed water being intimately mixed when drawn into the interior of said nozzle through said apertures due to action of said jet and being concurrently heated by contact therewith.

5. A device for use with a feed water heater in which water circulates through a closed path during the heating thereof, comprising: a tubular cross having four arms, with the first and second arms in coaxial alignment, and the third and fourth arms in coaxial alignment; means connecting said first arm to a source of feed water; means connecting said second and fourth arms to a feed water heater to complete a closed path in which feed water admitted through said first arm circulates during the heating thereof; a tubular steam nozzle disposed in alignment with said third arm and having an end portion situated between said first and second arms; and means connecting said nozzle to a source of steam that is discharged from said nozzle as a jet with sufficient force to circulate feed water entering said first arm, and initially introduced feed water entering said second arm, and said initially introduced feed water and circulating feed water being intimately mixed and concurrently heated due to the action of said jet.

6. Liquid heater comprising a generally U-shaped conduit, mixer means including means for directing a stream of heating fluid into said mixer means, inlet conduit means terminating adjacent said directing means for introducing to the heater liquid to be heated, recirculation conduit means communicating from a point adjacent one end of said U-shaped conduit to a point adjacent said directing means opposite said inlet conduit means for recirculating liquid within the heater, said stream of heating fluid serving to isolate said recirculation conduit from newly introduced liquid to be heated, means for passing liquid from said mixer means to said U-shaped conduit, and outlet conduit means communicating with said U-shaped conduit for withdrawing heated liquid from the heater.

7. Liquid heater according to claim 6, wherein said U-shaped conduit has two legs disposed one above the other, said recirculation conduit means communicates from a point adjacent the upper end of said U-shaped conduit, said means for passing liquid from said mixer means to said U-shaped conduit communicates with said U-shaped conduit at a point adjacent the lower end of said U-shaped conduit, and said outlet means communicates with said U-shaped conduit adjacent said upper end.

8. Liquid heater according to claim 7, wherein said directing means comprises a nozzle for directing a jet of heating fluid into said mixer means, said inlet conduit means terminates substantially directly below said directing means, and said recirculation conduit means communicates with said mixer means substantially directly above said directing means.

9. Liquid heater comprising conduit and storage means having inlet, recirculation outlet and withdrawal outlet, mixer means including means for directing a stream of heating fluid into said mixer means, inlet conduit means terminating adjacent said directing means for introducing to the heater liquid to be heated, recirculation conduit means communicating from said recirculation outlet of said conduit and storage means to said mixer means diametrically of said inlet conduit means for recirculating liquid within the heater, said stream of heating fluid serving to isolate said recirculation conduit means from newly introduced liquid to be heated, means for passing liquid from said mixer means to the inlet of said conduit and storage means, and withdrawal conduit means communicating with said conduit and storage means for withdrawing heated liquid from the heater.

10. Liquid heater according to claim 9, wherein said conduit and storage means is disposed generally horizontally, said mixer means is disposed lower than said conduit and storage means, said inlet conduit means terminates below said mixer means, said recirculation conduit means communicates with said mixer means above said directing means, and said withdrawal conduit means communicates with the upper portion of said conduit and storage means.

11. A feed water heater capable of supplying heated water as required at a constant pre-determined temperature irrespective of the rate of withdrawal therefrom which includes: water heating means defining a closed path in which water can circulate and including a U-shaped conduit having two legs disposed one above the other, a steam nozzle for introducing steam into said heater, inlet conduit means for introducing incoming feed water into said water heating means substantially directly below said nozzle, recirculation conduit means communicating from the upper end of said U-shaped conduit for recirculating water from said U-shaped conduit to a point substantially directly above said nozzle, means for supplying steam to said nozzle as a jet to move water away from said nozzle, said movement of water effecting circulation in said closed path, said jet serving to heat and mix recirculated water with incoming feed water and serving as a barrier preventing feed water from entering said recirculation conduit means, a temperature responsive valve for controlling the rate of steam flow through said steam supply means, said valve closing at a pre-determined elevated temperature and opening as the temperature drops below said elevated temperature, means responsive to the temperature of water in said heating means means for controlling said valve, and means communicating with said U-shaped conduit for withdrawing water from said heating means as said water circulates.

References Cited in the file of this patent
UNITED STATES PATENTS

| | | |
|---|---|---|
| 1,806,394 | Giesler et al. | May 19, 1931 |
| 1,960,013 | Jacobsen | May 22, 1934 |
| 2,212,288 | Decker | Aug. 20, 1940 |
| 2,297,768 | Hutchings | Oct. 6, 1942 |
| 2,372,533 | Torbett | Mar. 27, 1945 |
| 2,492,253 | Wobser et al. | Dec. 27, 1949 |